(12) United States Patent
Beekhuizen et al.

(10) Patent No.: US 6,536,287 B2
(45) Date of Patent: Mar. 25, 2003

(54) SIMPLIFIED CAPACITANCE PRESSURE SENSOR

(75) Inventors: Harold Beekhuizen, Tucson, AZ (US); Armand Issaian, Tucson, AZ (US); Charles H. Umeda, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/931,474

(22) Filed: Aug. 16, 2001

(65) Prior Publication Data
US 2003/0033884 A1 Feb. 20, 2003

(51) Int. Cl.[7] ................................. G01L 9/12
(52) U.S. Cl. .......................... 73/718; 73/724
(58) Field of Search ............... 73/700–756; 361/283, 361/283.4; 439/446, 447

(56) References Cited

U.S. PATENT DOCUMENTS

| | | |
|---|---|---|
| 2,403,915 A | 7/1946 | Evans |
| 2,868,894 A | 1/1959 | Schultz |
| 3,748,571 A | 7/1973 | Kurtz |
| 3,858,097 A | 12/1974 | Poyle |
| 4,064,550 A | 12/1977 | Dias et al. |
| 4,336,567 A * | 6/1982 | Anastasia ............... 361/283.3 |
| 4,380,041 A | 4/1983 | Ho |
| 4,422,125 A | 12/1983 | Antonazzi et al. |
| 4,689,999 A | 9/1987 | Shkedi |
| 4,974,117 A | 11/1990 | Irwin |
| 4,987,782 A | 1/1991 | Shkedi et al. |
| 5,090,246 A | 2/1992 | Colla et al. |
| 5,189,591 A | 2/1993 | Bernot |
| 5,357,806 A | 10/1994 | Dennis et al. |
| 5,757,608 A | 5/1998 | Bernot et al. |
| 5,992,240 A * | 11/1999 | Tsuruoka et al. ............ 73/718 |
| 6,142,614 A * | 11/2000 | Hashizume et al. ....... 310/328 |
| 6,267,009 B1 * | 7/2001 | Drewes et al. .......... 361/283.4 |
| 6,374,680 B1 * | 4/2002 | Drewes et al. ................ 73/718 |

* cited by examiner

Primary Examiner—Hezron Williams
Assistant Examiner—Andre Allen
(74) Attorney, Agent, or Firm—Keith A. Newburry, Esq.

(57) ABSTRACT

A capacitance pressure sensor includes a pressure diaphragm, an acceleration diaphragm, and a support member. The pressure diaphragm and acceleration diaphragm each include electrodes on surfaces that face each other, thereby forming a pressure sensitive capacitor. The pressure sensitive capacitor is coupled to the support member, which is in turn directly coupled to a base plate. The structure of the pressure sensor is simplified structure in that it includes no additional stress isolation components.

35 Claims, 2 Drawing Sheets

SIMPLIFIED CAPACITANCE PRESSURE SENSOR

BACKGROUND OF THE INVENTION

The present invention relates to pressure sensors and, more particularly, to capacitance-type pressure sensors.

Pressure sensors are used in numerous industries. One of the industries in which pressure sensors are especially pervasive is the aircraft industry. This is because aircraft pilots need to directly monitor various pressures, such as cabin pressure, atmospheric pressure, and turbine engine pressure. In addition, various other conditions that pilots need to monitor, or that the aircraft's avionics system uses to control portions of the aircraft, use pressure sensors. For example, pressure sensors are used in systems that provide information about aircraft electronic turbine engine control, aircraft altitude, angle of attack, air speed, slip angle, and yaw angle, and turbine engine pressures. Thus, it is important that the pressure sensors used on aircraft be accurate and reliable.

A particular type of pressure sensor that has found widespread use in the aircraft industry is a quartz-constructed, capacitance-type pressure sensor. This pressure sensor type is particularly advantageous for aircraft applications because of its relatively low temperature coefficient of expansion, its nearly nonexistent hysteresis characteristics, its accuracy, stability and ruggedness.

However, this pressure sensor, while generally acceptable, when installed in its intended end-use environment, such as an aircraft, may exhibit certain drawbacks. In particular, when the pressure sensor assembly is exposed to varying external to internal differential pressure, the pressure sensor mounting hardware may deflect. Additionally, depending upon the particular end-use environment, the pressure sensor assembly may be exposed to varying vibratory forces. These deflections and vibrations may adversely affect sensor accuracy and may fatigue the electrical interconnections, which may cause pressure sensor failure.

Hence, to address these drawbacks, pressure sensors have been constructed to include a stress isolation component, such as a stem or an isolation diaphragm. The stem or isolation diaphragm are used to connect the pressure sensor to the mounting hardware, and additionally function to isolate the pressure sensor from the above-noted vibration stresses and deflections that the pressure sensor mounting hardware experiences.

Although using the stem or isolation diaphragm address the previously noted drawbacks, each presents its own disadvantages. For example, because the stem is mounted on an external circuit board, the stem-circuit board mount occupies component mounting area on the circuit board. Moreover, the housing into which the pressure sensor is installed should be sized to accommodate the stem. Both of these factors increase manufacturing costs and complexity.

Using the isolation diaphragm also results in increased manufacturing costs. The increased costs are associated with, among other things, the manufacturing steps for adding the isolation diaphragm to the pressure sensor. In particular, additional openings are provided through the isolation diaphragm to accommodate the sensor leads. These additional openings are processed by an additional annealing cycle to relieve the stresses associated with the formation of the openings. The isolation diaphragm is mounted by an additional laser welding operation. This process requires a significant amount of precision, and results in sensor scrap rates that are greater than otherwise desired.

Hence, there is a need for a rugged capacitance pressure sensor that overcomes one or more of the above-noted drawbacks. Namely, a pressure sensor that is sufficiently accurate when installed in its end-use environment, such as an aircraft, that does not require a special stem or isolation diaphragm and, therefore, is less expensive to manufacture.

SUMMARY OF THE INVENTION

The present invention provides an accurate, acceleration and vibration compensated capacitance pressure sensor that has a simplified structure, in that it includes no an additional stress isolation component.

According to an aspect of the present invention, and by way of example only, a pressure sensor includes a sensor portion, a support member, a base plate, and a plurality of electrically conductive flexible interconnect members. The support member is coupled to the sensor portion and includes a plurality of electrically conductive films on a surface thereof. The base plate includes a mounting surface coupled to the support member and a plurality of terminals passing therethrough. The plurality of electrically conductive flexible interconnect members are individually coupled between the plurality of electrically conductive films and the plurality of terminals.

Other independent features and advantages of the preferred sensor will become apparent from the following detailed description, taken in conjunction with the accompanying drawings which illustrate, by way of example, the principles of the invention.

DETAILED DESCRIPTION OF VARIOUS EMBODIMENTS

Figure 1:
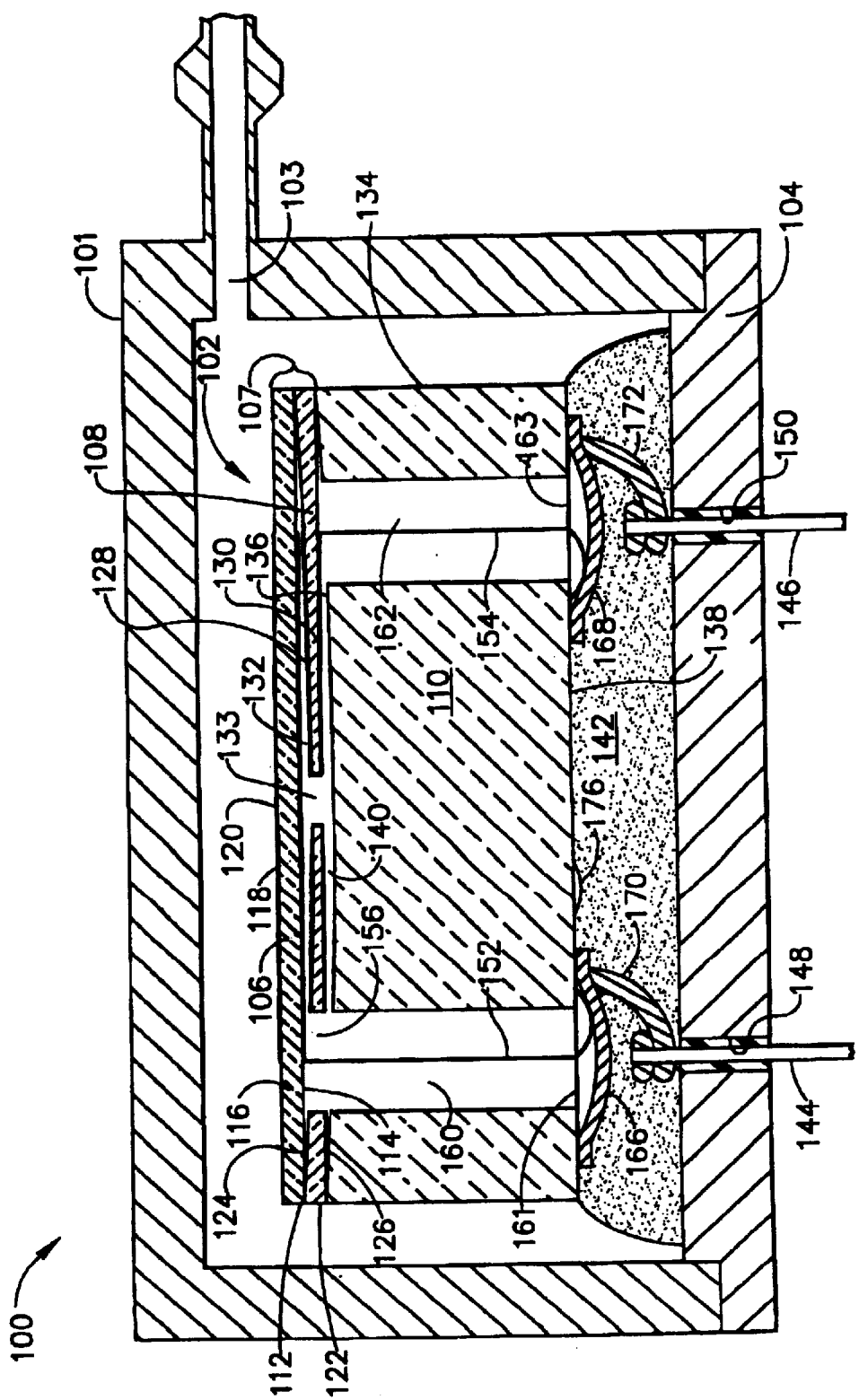
FIG. 1 is a cross sectional view of a capacitance pressure sensor according to a particular preferred embodiment of the present invention that is configured to sense absolute pressure.

A particular embodiment of a capacitance pressure sensor is depicted in FIG. 1. As depicted therein, the pressure sensor 100 includes a sensor capsule 102 that is mounted to a base plate 104 and surrounded by a cover assembly 101 that includes a port 103. The cover assembly 101 is preferably adhered to the base plate 104 with an adhesive. However, it will be appreciated that the cover 101 and base plate 104 could be joined by threaded fasteners, with either a leak-tight gasket or O-ring seal, or by laser welding, which will create a leak-tight seal between the cover assembly 101 and the base plate 104 without additional sealing agents. The sensor capsule 102 includes a sensor portion 107 that is supported by a support member 110. The sensor portion 107 is constructed of two main pieces, a pressure diaphragm 106 and an acceleration diaphragm 108. Preferably, the pressure diaphragm 106, acceleration diaphragm 108, and support member 110 are each individual quartz pieces. It will be appreciated, however, that quartz is merely exemplary of a particular preferred embodiment and that other materials may be used. For example, these pieces could be constructed of aluminosilicate glass or silicon. Moreover, for convenient fabrication of the sensor capsule 102 it is preferable that these individual pieces each have a circular, disc-shaped configuration. Nonetheless, the skilled artisan will appreciate that other shapes and configurations may be used. With this general background in mind, a more detailed description of the pressure sensor 100 depicted in FIG. 1 will now be provided.

Attention will be turned first to the pressure diaphragm 106, which includes a peripheral portion 112, a first surface 114, and a second surface 116. A first electrode 118 is deposited on the first surface 114, and a second electrode 120 is deposited on the second surface 116. The first electrode 118, as will be discussed further below, is used to form a plate of a pressure sensitive capacitor. For credible pressure measurements, the pressure diaphragm 106 should respond only to the pressure of the medium being monitored, and all other extraneous forces should be minimized or canceled. Therefore, the second electrode 120 is deposited on the second surface 116 of the pressure diaphragm 106, not to form a capacitor, but rather to balance and mutually cancel forces exerted on the pressure diaphragm 106 by inherent stresses built up in the first and second electrodes 118, 120 when these electrodes are deposited. Specifically, if only the first surface 114 included an electrode, then the pressure diaphragm 106 would deflect not only due to the pressure of the medium being monitored, but also due to stress in the first electrode 118 itself. This would result in inaccuracies. However, by including first and second electrodes 118, 120 that are preferably of like shape, thickness, and material on both surfaces 114, 116 of the pressure diaphragm 106, any stresses exerted by the first and second electrodes 118, 120 on pressure diaphragm 106 will be balanced. It is noted that the first electrode 118 and the second electrode 120 are preferably comprised of conductive metals including, but not limited to, titanium, gold, platinum, and alloys containing these metals. It will be appreciated that other conductive metals and metal alloys may also be employed.

Turning now to the acceleration diaphragm 108, it can be seen that it is configured similar to the pressure diaphragm 106, in that it also includes a peripheral portion 122, a first surface 124, and a second surface 126. The peripheral portion 122 of the acceleration diaphragm 108 is coupled to the peripheral portion 112 of the pressure diaphragm 106, with its first surface 124 facing the pressure diaphragm first surface 114 to define a first space 132 between these surfaces. Similar to the pressure diaphragm 106, a third electrode 128 and a fourth electrode 130 are deposited on the acceleration diaphragm first surface 124 and second surface 126, respectively. Unlike the first and second electrodes 118, 120, the third electrode 128 and fourth electrode 130 are electrically connected via a through-hole 133. Hence, as mentioned above, the first electrode 118, the third electrode 128, and the first space 132 form a pressure sensitive capacitor. The function of the fourth electrode 130 is two-fold. One of the functions is identical to that of the second electrode 120, which was discussed above. The other function is to provide a point of electrical contact to the third electrode 128, which will be discussed further below.

The final structural piece of the sensor capsule 102 is the support member 110. The support member 110 includes a peripheral portion 134, a first surface 136, and a second surface 138. The support member peripheral portion 134 is coupled to the peripheral portion 122 of the acceleration diaphragm 108, with the support member first surface 136 facing the acceleration diaphragm second surface 126, to define a second space 140 between the support member 110 and the acceleration diaphragm 108. Since the support member first surface 136 surface does not have an electrode deposited thereon, a capacitor is not formed between the acceleration diaphragm 108 and the support member 110. Indeed, the purpose of the support member 110 is not to provide any sensing capabilities, but to support and couple the pressure diaphragm 106 and acceleration diaphragm 108 to the base plate 104 and to seal the leads (discussed further below) coupled to the first 118 and fourth 130 electrodes. The support member further serves to partially buffer the pressure diaphragm 106 and acceleration diaphragm 108 from external mechanical stresses.

As was alluded to above, the support member 110 couples the pressure 106 and acceleration 108 diaphragms to the base plate 104. Specifically, the Support member 110 is directly coupled to the base plate 104 via a layer of a resilient adhesive 142. The resilient adhesive 142 may be any one of numerous resilient adhesives known in the art but, in the depicted embodiment, is a silicone, polyurethane, or polythioether adhesive, depending on the particular environment into which the sensor 100 will be placed. The base plate 104 includes, but is not limited to, two or more terminals that are used to couple the pressure sensor 100 to external equipment via, for example, a printed circuit board (not illustrated). In the particular embodiment depicted in FIG. 1, the terminals include a first terminal 144 and a second terminal 146 that extend, respectively, through a first opening 148 and a second opening 150 in the base plate 104, and are sealed in the openings 148, 150. It will be appreciated that the base plate could include other numbers of terminals, as necessary, to meet system interconnectivity requirements or if more terminals are needed for the sensor capsule 102.

The first electrode 118 and the third electrode 128, which comprise a variable pressure sensitive capacitor, are electrically coupled to the first and second terminals 144, 146, respectively, via electrically conductive leads, sealing films, sealing caps, and flexible interconnects. Specifically, one or more first leads 152 are electrically coupled at one end to the first electrode 118. The one or more first leads 152 pass through a first opening 156 in the acceleration diaphragm 108 and a second opening 160 in the support member 110, and are electrically coupled at another end to a first electrically conductive sealing film 161. Similarly, one or more second leads 154 are electrically coupled at one end to the third electrode 128 via the fourth electrode 130. The one or more second leads 154 pass through a third opening 162 in the support member 110, and are electrically coupled at another end to a second electrically conductive sealing film 163. Preferably, the one or more first 152 and second leads 154 are relatively thin, and are constructed of a relatively flexible conductive material, such as aluminum or gold. Moreover, for reliability, the leads 152, 154 each preferably comprise a plurality of redundant leads. In addition, the first and second sealing films 161, 163 each preferably comprise three layers of different metals. These three layers include a layer of titanium overlayed by a layer of platinum, which is in turn overlayed by a layer of gold for solderability. Again, these particular metals and layering order are only exemplary of a preferred embodiment and other metals and layer orders could be utilized. It will be appreciated that the number and arrangement of the openings in the acceleration diaphragm 108 and the support member 110 may be different than what is depicted in FIG. 1.

A first electrically conductive sealing cap 166 is coupled to the first sealing film 161, and a second electrically conductive sealing cap 168 is coupled to the second sealing film 163. Specifically, in the depicted embodiment, the first 166 and second 168 sealing caps are hermetically sealed to the first 161 and second 163 sealing films, respectively, by an indium solder. It is noted that indium solder is preferred because it remains flexible even at very low temperatures. Though it will be appreciated that other solder types, such as ordinary tin-lead solder could be used. Moreover, the sealing caps 166, 168 are preferably constructed of Invar, due to this material's low temperature coefficient of expansion. Though again, other materials could be used.

A first electrically conductive interconnect member 170 is coupled between the first terminal 144 and the first sealing cap 166, and a second electrically conductive interconnect member 172 is coupled between the second terminal 146 and the second sealing cap 168. The interconnect members 170, 172 are preferably constructed of a relatively thin, flexible, and solderable material such as nickel. By constructing the interconnect members 170, 172 of such a material, the interconnect members 170, 172 can be wrapped around, and soldered to, the terminals 144, 146 in the base plate 104, with some slack maintained in the interconnect members 170, 172. As a result, any vibration and/or deflection of the base plate 104 will not be transmitted through the interconnect members 170, 172 to the support member 110, and through the support member 110 to the pressure and acceleration diaphragms 106, 108, thereby preventing inaccuracies. Moreover, any base plate 104 vibration and/or deflection will not result in failure of the interconnects members 170, 172 due to fatigue stress. It will be appreciated that other materials, beside nickel, could be used for the first and second flexible interconnects members 170, 172. Non-limiting examples of such materials include copper, nickel, and copper alloys, which may be electroplated with solderable metals.

A temperature sensor 176, such as a thermistor, may also be included as part of the pressure sensor 100 to provide temperature compensation. In particular, if the temperature sensor 176 is included, it is preferably coupled to the surface 138. Though not explicitly depicted, it will be appreciated that concomitant leads are also coupled to the temperature sensor 176 to provide electrical connection to external equipment.

Having described the pressure sensor 100 in detail from a structural standpoint, a description of a preferred process for making the pressure sensor 100 depicted in FIG. 1 will now be provided. This discussion is predicated on the use of quartz as the preferred material for making the sensor capsule 102.

The first step in the process is to slice the pieces to be used for the pressure diaphragm 106, the acceleration diaphragm 108, and the support member 110 from a quartz rod. The through-hole 133, and the first 156, second 160, and third 162 openings are then formed in the acceleration diaphragm 108 and the support member 110. After this, the pieces are annealed at an appropriate temperature to relieve any stresses induced in the pieces by the operations that formed the openings. All of the pieces are then optically ground and polished to achieve the required surface finish, part geometry, and required thickness.

Following the above-described operations, the electrodes 118, 120, 128, 130 and sealing films 161, 163 are deposited onto the appropriate surfaces. Preferably, a sputtering machine is used to deposit the electrodes and films, though other methods, such as screen printing and photolithographic methods, may also be used. The pressure diaphragm 106, the acceleration diaphragm 108, and the support member 110 are then stacked on a tool, and are fused together at their respective peripheral portions 112, 122, 134 to provide a uniform, hermetic, and substantially permanent bond. Preferably, this fusing is accomplished by a laser welding process, though other processes may be used, such as a diffusion bonding process or a glass fritting process.

After the pressure diaphragm 106, the acceleration diaphragm 108, and support member 110 are fused together to form the sensor capsule 102, the first 152 and the second 154 leads are then coupled between the first electrode 118 and first sealing film 161 and between the second electrode 128 and the second sealing film 163a respectively. This is accomplished by any one of numerous wire bonding processes known in the art. The first 166 and second 168 sealing caps, with the first 170 and second 172 interconnect members coupled thereto, are then positioned onto the first 161 and second 163 sealing films, respectively, in such a manner as to cover the second 160 and third 162 openings. Preferably, the first and second interconnect members 170, 172 are coupled to the first and second sealing caps 166, 168, respectively, by a welding process. Indium solder pieces are placed around the periphery of the sealing caps 166, 168, such that the pieces contact both sealing caps 166, 168 and the sealing films 161, 163.

Thereafter, the sensor capsule 102 is placed in a vacuum chamber and a vacuum is drawn in the chamber. While exposed to the vacuum, the temperature of the sensor capsule 102 within the vacuum chamber is increased to the flow temperature of the indium solder. This allows the indium solder to form a hermetic seal and electrical connection between the sealing caps 166, 168 and the metal sealing films 161, 163, respectively. After a predetermined time period at the flow temperature, the sensor capsule temperature is reduced to solidify the indium solder, while maintaining the vacuum in the chamber. Thus, a reference vacuum is sealed in the interior of the sensor capsule 102. When the sensor capsule 102 has cooled, the vacuum chamber is vented to atmospheric pressure and the sensor capsule 102 is removed.

The first 170 and second 172 flexible interconnect members are then attached to the first 144 and second 146 terminals of the base plate 104, respectively. Preferably, this is accomplished by wrapping the ends of each of the interconnect members 170, 172 at least one turn around its respective terminal 144, 146, and soldering the flexible interconnect members 170, 172 to terminals 144, 146, respectively. The sensor capsule 102 is then adhered to the base plate 104 using one of the above-noted resilient adhesives 142. Once this is complete, the cover 101 is placed over the sensor capsule 102 and coupled to the base plate 104 using one of the methods discussed above. The pressure sensor 100 may then be installed onto a circuit card assembly for the next level of manufacturing.

When the pressure sensor 100 is installed into its end-use environment, and a pressure is applied to the pressure diaphragm 106, via the port 103 in the cover 101, the pressure diaphragm 106 deflects toward the acceleration diaphragm 108. As a result, the distance between the first electrode 118 and third electrode 128 is decreased, which changes the capacitance formed by these electrodes. The capacitance increases with increased applied pressure, and the external equipment to which the pressure sensor 100 is coupled produces a signal representative of the pressure. The acceleration diaphragm 108 is included to compensate for any vibration or acceleration/deceleration that the pressure sensor 100 may experience. Specifically, when the pressure sensor 100 experiences vibration or acceleration/deceleration, the pressure diaphragm 106 and the acceleration diaphragm 108 are similarly effected. Thus, the acceleration/deceleration and/or vibration does not result in a change of capacitance.

Figure 2:
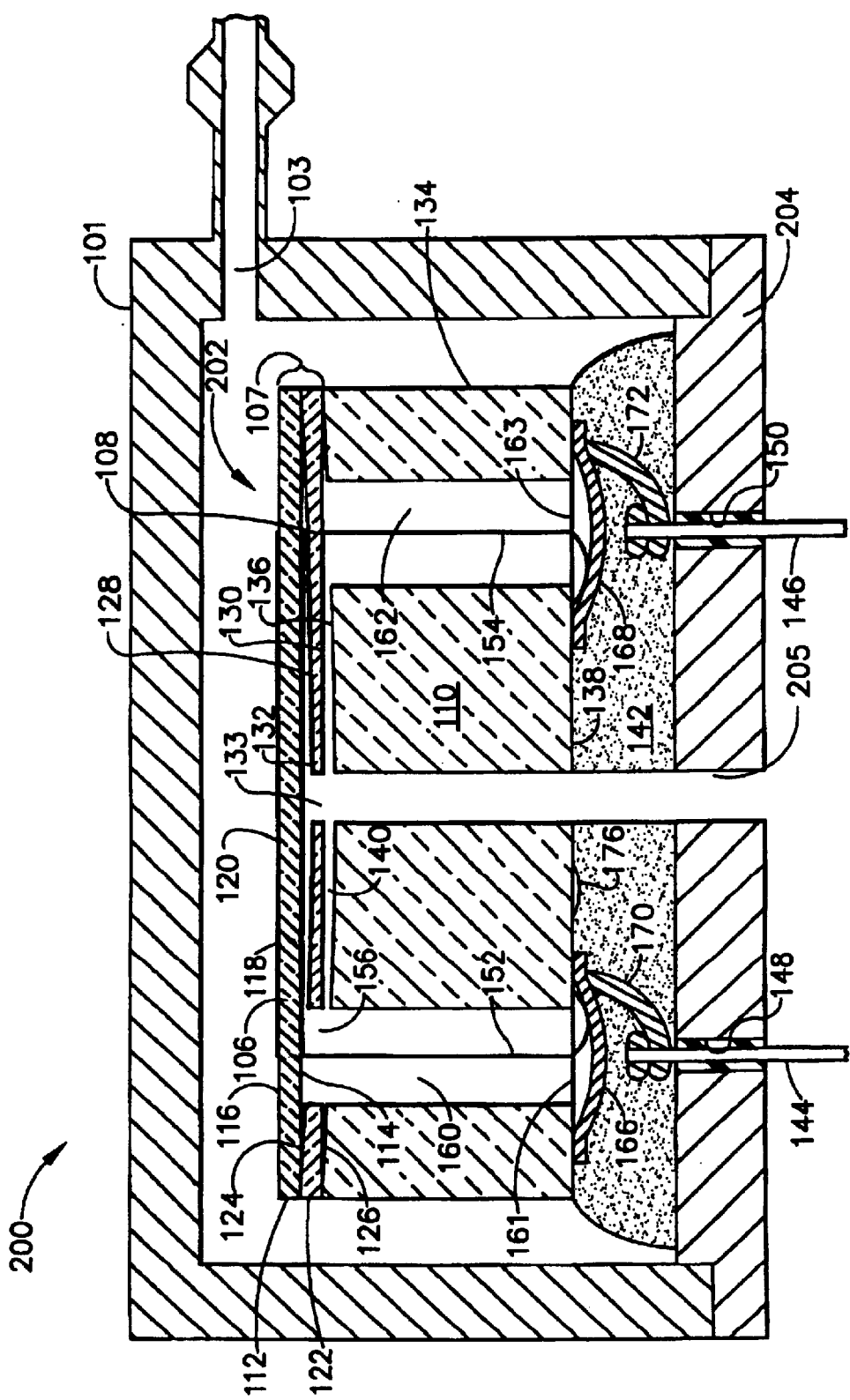
FIG. 2 is a cross sectional view of a capacitance pressure sensor according to a particular preferred embodiment of the present invention that is configured to sense differential pressure.

The pressure sensor 100 depicted in FIG. 1 is configured to sense absolute pressure. However, the skilled artisan will appreciate that the pressure sensor can also be configured to sense differential pressure. Indeed, such a configuration is depicted in FIG. 2. The pressure sensor 200 depicted in FIG. 2 is substantially identical to that depicted in FIG. 1, but includes a second port 205 in the base plate 204. Additionally, the sensor capsule 202 is not sealed, which allows the pressure in the second port 205 to be coupled to the inside of the sensor capsule 202.

The pressure sensors 100, 200 depicted and described herein do not require a special stem or isolation diaphragm to prevent vibration induced inaccuracies in the pressure measurements. The flexible interconnect members 170, 172 effectively decouple any deflections and vibrations experienced by the mounting hardware. Thus, the sensors 100, 200 are less expensive and easier to manufacture than other pressure sensors.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A pressure sensor, comprising:
   a sensor portion;
   a support member coupled to the sensor portion and including a plurality of electrically conductive films on a surface thereof;
   a base plate including a mounting surface and a plurality of terminals passing therethrough, the mounting surface coupled to the support member; and
   a plurality of electrically conductive flexible interconnect members individually coupled between the plurality of electrically conductive films and the plurality of terminals.

2. The sensor of claim 1, wherein the sensor portion comprises:
   a first diaphragm including a peripheral portion, a first surface, and a second surface;
   a second diaphragm including a peripheral portion, a first surface, and a second surface, the second diaphragm peripheral portion coupled to the first diaphragm peripheral portion with the second diaphragm first surface positioned adjacent to and spaced apart from the first diaphragm second surface to define a first space there between;
   a first electrode deposited on the first diaphragm first surface; and
   a second electrode deposited on the second diaphragm first surface,
   wherein the first electrode, the second electrode, and the first space form a capacitor.

3. The sensor of claim 2, wherein the support member comprises:
   a peripheral portion, a first surface, and a second surface, the support member peripheral portion coupled to the second diaphragm peripheral portion with the support member first surface positioned adjacent to and spaced apart from the second diaphragm second surface to define a second space there between, and the support member second surface including the electrically conductive films.

4. The sensor of claim 3, wherein the first diaphragm, the second diaphragm, and the support member each comprise quartz.

5. The sensor of claim 3, further comprising:
   a temperature sensor coupled to the support member second surface.

6. The sensor of claim 2, further comprising:
   a third electrode deposited on the first diaphragm second surface; and
   a fourth electrode deposited on the second diaphragm second surface.

7. The sensor of claim 2, wherein the plurality of electrically conductive films comprises a first conductive film and a second conductive film, and wherein the sensor further comprises:
   a first lead coupled between the first electrode and the first conductive film; and
   a second lead coupled between the second electrode and the second conductive film.

8. The sensor of claim 1, wherein the interconnect members are relatively thin and comprise a relatively flexible conductive material.

9. The sensor of claim 1, wherein the plurality of terminals pass through, and are sealed to, individual openings in the base plate.

10. The sensor of claim 1, wherein the base plate is coupled to the support member with an elastomeric material.

11. The sensor of claim 1, further comprising:
    a cover coupled to the base plate and surrounding the sensor portion and the support member.

12. The sensor of claim 1, further comprising:
    a cover coupled to the base plate and surrounding the sensor portion and the support member; and
    a first port extending through the cover.

13. The sensor of claim 12, further comprising:
    a second port extending through the base plate, whereby the sensor is capable of sensing a differential pressure.

14. The sensor of claim 1, further comprising:
    a plurality of electrically conductive sealing caps individually interposed between, and electrically coupled to, each of the plurality of sealing films and each of the flexible interconnect members.

15. A capacitive pressure sensor, comprising:
    a first diaphragm including a peripheral portion, a first surface, and a second surface, the first surface having a first electrode deposited thereon;
    a second diaphragm including a peripheral portion, a first surface, and a second surface, the second diaphragm first surface having a second electrode deposited thereon, the second diaphragm peripheral portion coupled to the first diaphragm peripheral portion with the second diaphragm first surface positioned adjacent to and spaced apart from the first diaphragm first surface to define a first space there between; and
    a support member including a peripheral portion, a first surface, and a second surface, the support member peripheral portion coupled to the second diaphragm peripheral portion with the support member first surface positioned adjacent to and spaced apart from the second diaphragm second surface to define a second space there between; first and second electrically conductive flexible interconnect members electrically coupled to the first and second electrodes, respectively; and base plate including a support surface coupled to the support member second surface, wherein the first electrode, the second electrode, and first space form a capacitor.

16. The sensor of claim 15, further comprising:

a third electrode deposited on the first diaphragm second surface; and a fourth electrode deposited on the second diaphragm second surface and electrically coupled to the second electrode.

17. The sensor of claim 16, wherein the base plate is coupled to the support member second surface with an elastomeric material.

18. The sensor of claim 16, further comprising:

a cover coupled to the base plate and surrounding the peripheral portions of the first diaphragm, the second diaphragm, and the support member, respectively.

19. The sensor of claim 16, wherein the first diaphragm, the second diaphragm, and the support member each comprise quartz.

20. The sensor of claim 16, further comprising:

a cover coupled to the base plate and surrounding the first diaphragm, the second diaphragm, and the support member; and a first port extending through the cover.

21. The sensor of claim 20, further comprising:

a second port extending through the base plate, whereby the sensor is capable of sensing a differential pressure.

22. The sensor of claim 16, further comprising:

a first conductive film and a second conductive film each deposited on the support member second surface and electrically coupled to the first and second conductive flexible interconnect members, respectively.

23. The sensor of claim 22, further comprising:

a first lead coupled between the first electrode and the first conductive film; and a second lead coupled between the second electrode and the second conductive film.

24. The sensor of claim 23, further comprising:

first and second terminals passing through, and sealed to, individual openings in the base plate.

25. The sensor of claim 24, further comprising:

a plurality of electrically conductive sealing caps individually interposed between, and electrically coupled to, each of the plurality of sealing films and each of the flexible interconnect members.

26. The sensor of claim 24, wherein the first and second electrically conductive flexible interconnect members are relatively thin and comprise a relatively flexible conductive material.

27. The sensor of claim 15, further comprising:

a temperature sensor coupled to the support member second surface.

28. The sensor of claim 27, further comprising:

a temperature sensor coupled to the support member second surface.

29. A capacitive pressure sensor, comprising:

a first diaphragm including a peripheral portion, a first surface having a first electrode deposited thereon, and a second surface having a second electrode deposited thereon;

a second diaphragm including a peripheral portion, a first surface having a third electrode deposited thereon, and a second surface having a fourth electrode deposited thereon, the second diaphragm peripheral portion coupled to the first diaphragm peripheral portion with the second diaphragm first surface positioned adjacent to and spaced apart from the first diaphragm first surface to define a first space there between; and a support member including a peripheral portion, a first surface, and a second surface, the support member peripheral portion coupled to the second diaphragm peripheral portion with the support member first surface positioned adjacent to and spaced apart from the second diaphragm second surface to define a second space there between;

first and second conductive films deposited on the support member second surface;

a base plate including a mounting surface coupled to the support member second surface;

first and second leads electrically coupled between the first and third electrodes and the first and second conductive film, respectively;

first and second terminals passing through, and sealed to, individual openings in the base plate;

first and second electrically conductive sealing caps electrically coupled to the first and second conductive films, respectively; and first and second electrically conductive flexible interconnect members electrically coupled between the first and second sealing caps and the first and second terminals, respectively, wherein the first electrode, the third electrode, and the first space form a capacitor.

30. The sensor of claim 29, wherein the base plate is coupled to the sixth surface with an elastomeric material.

31. The sensor of claim 29, further comprising:

a cover coupled to the base plate and surrounding the peripheral portions of the first diaphragm, the second diaphragm, and the support member, respectively.

32. The sensor of claim 29, wherein the first diaphragm, the second diaphragm, and the support member each comprise quartz.

33. The sensor of claim 29, wherein the first and second electrically conductive flexible interconnect members are relatively thin and comprise a relatively flexible conductive material.

34. The sensor of claim 29, further comprising:

a cover coupled to the base plate and surrounding the first diaphragm, the second diaphragm, and the support member; and a first port extending through the cover.

35. The sensor of claim 34, further comprising:

a second port extending through the base plate, whereby the sensor is capable of sensing a differential pressure.

* * * * *